Dec. 9, 1924.

F. L. EGY

WHEEL PULLER

Filed Aug. 11, 1923

F. L. Egy INVENTOR

BY Victor J. Evans

ATTORNEY

Dec. 9, 1924.   1,518,974
F. L. EGY
WHEEL PULLER
Filed Aug. 11, 1923   2 Sheets-Sheet 2
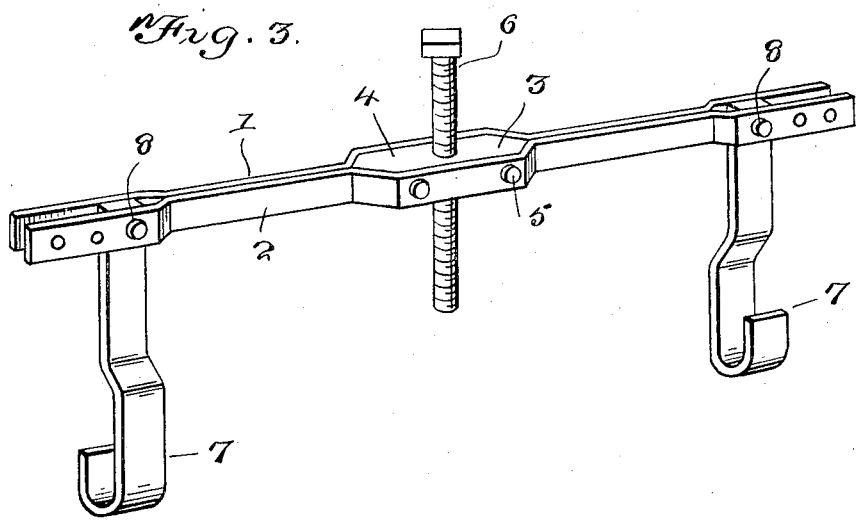
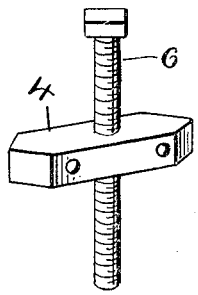
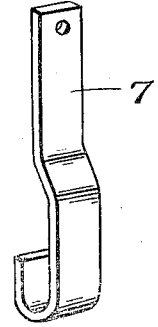

Patented Dec. 9, 1924.

1,518,974

UNITED STATES PATENT OFFICE.

FOREST L. EGY, OF OAKLAND, CALIFORNIA.

WHEEL PULLER.

Application filed August 11, 1923. Serial No. 656,863.

*To all whom it may concern:*

Be it known that I, FOREST L. EGY, a citizen of the United States, residing at Oakland, in the county of Alameda and State of California, have invented new and useful Improvements in Wheel Pullers, of which the following is a specification.

This invention relates to a hub puller for vehicles, the general object of the invention being to provide a holder with means for attaching it to a wheel, a nut carried by the holder and a bolt engaging the nut and adapted to engage the spindle to exert pressure thereon to force the wheel off the spindle.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figures 3, 4 and 5 are detail views of the device itself.

Figure 1:
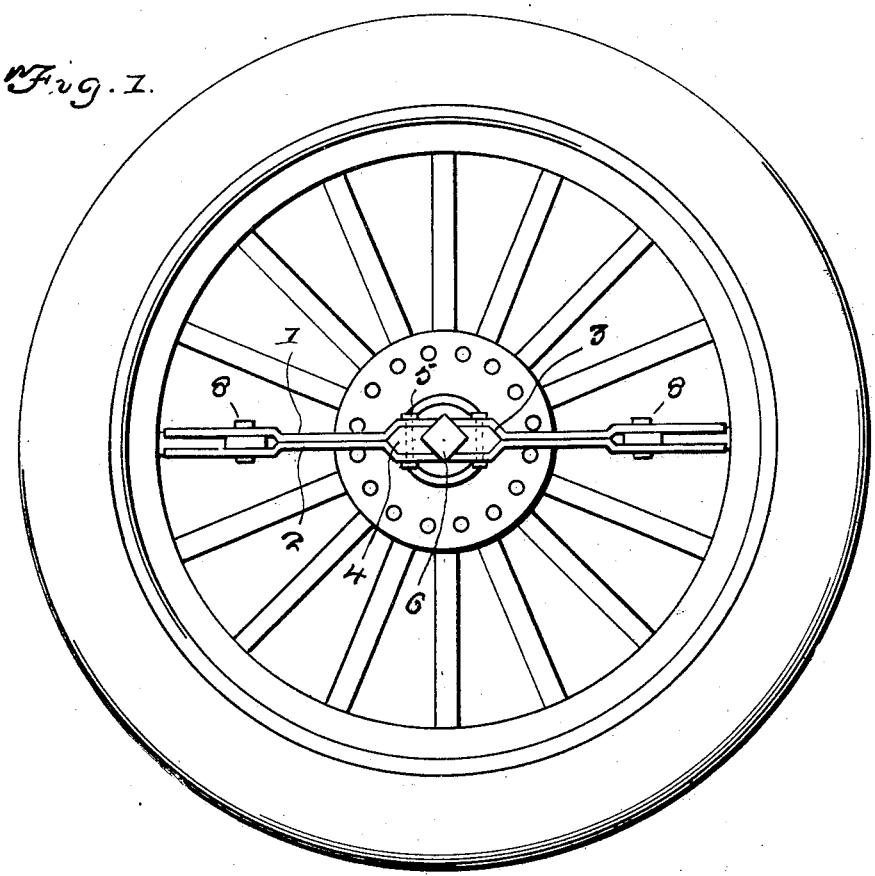
Figure 1 is a view showing the invention in use.

As shown in these views 1 and 2 indicate a pair of straps or strips which are fastened together and which have their center portions offset to form a space 3 to receive a nut 4 which is held in said space by the bolts 5. This nut is adapted to receive the bolt 6. The ends of the strips are spaced apart to receive the hook-shaped arms 7 which are fastened to the strips by the bolts 8. The strips may be provided with a number of bolt holes so that the arms can be placed in different positions in the spaces at the ends of the strips and thus make the device usable on different sizes of wheels.

Figure 2:
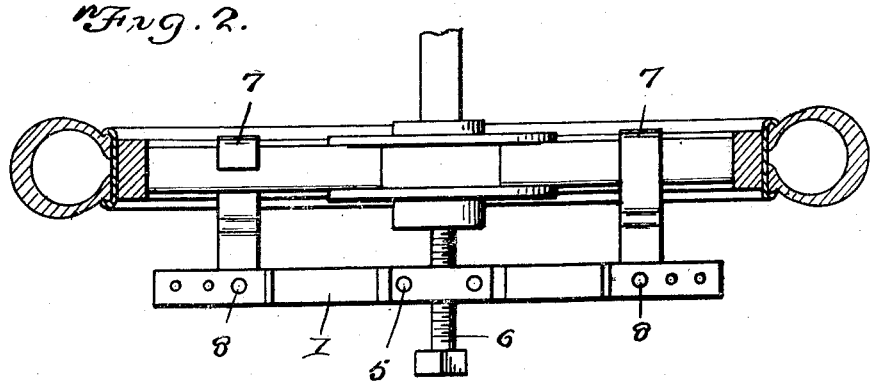
Figure 2 is a transverse sectional view through Figure 1.

The hooks 7 at the free ends of the arms are placed in engagement with a pair of the spokes of the wheel, as shown in Figures 1 and 2, the hub cap and nut being first removed from the axle. The device must be so placed that the end of the bolt 6 will be opposite the center of the axle. The bolt is then screwed in until its pointed end engages the end of the axle when further movement will exert pressure and thus force the wheel from the axle.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A wheel puller of the class described comprising a pair of strips placed together with their outer ends offset and their centers bent outwardly, a block placed in the central space, bolts connecting the block with the strips, said block having a threaded hole therein, a screw threaded axle engaging member passing through the hole, a pair of hook-shaped arms engaging the spaces at the ends of the strips and bolts for connecting the arms with the strips, the spaced ends of the arms having a plurality of holes therein for receiving the bolts so that the arms can be adjusted on the strips.

In testimony whereof I affix my signature.

FOREST L. EGY.